United States Patent [19]

Weilacher

[11] Patent Number: 4,897,103

[45] Date of Patent: Jan. 30, 1990

[54] CONDUIT FOR MOLTEN GLASS

[75] Inventor: Roger P. Weilacher, Sapulpa, Okla.

[73] Assignee: Liberty Glass Company, Sapulpa, Okla.

[21] Appl. No.: 242,773

[22] Filed: Sep. 12, 1988

[51] Int. Cl.⁴ .............................................. C03B 5/16
[52] U.S. Cl. ...................................... 65/346; 14/16.1; 65/172; 65/337; 65/340
[58] Field of Search .................. 65/346, 172, 337, 340; 14/16.1

[56] References Cited

U.S. PATENT DOCUMENTS

| | | | |
|---|---|---|---|
| 1,999,762 | 4/1935 | Howard | 65/346 X |
| 3,183,865 | 5/1965 | Ross | 65/346 X |
| 3,332,758 | 7/1967 | Firnhaber | 65/346 X |
| 3,435,578 | 4/1969 | Taylor et al. | 65/346 X |
| 4,003,730 | 1/1977 | Brady et al. | 65/DIG. 14 |
| 4,738,707 | 4/1988 | Dunn | 65/346 |

Primary Examiner—Robert L. Lindsay
Attorney, Agent, or Firm—Senniger, Powers, Leavitt and Roedel

[57] ABSTRACT

A conduit for conducting molten glass in a glass making operation comprising an elongate superstructure, an elongate carriage, a plurality of refractory blocks assembled on the carriage to form a channel for conducting molten glass, and a plurality of rollers for supporting the carriage in the superstructure and allowing the carriage to be slid out of the superstructure for servicing. The conduit further comprises clamping members extending along the sides of the conduit roof, and support members on the superstructure which can be operated transversely inwardly to cause the clamping member to engage and support the roof so that the carriage can be removed from the superstructure independently of the roof.

13 Claims, 4 Drawing Sheets

CONDUIT FOR MOLTEN GLASS

BACKGROUND OF THE INVENTION

This invention relates to a conduit for molten glass, and more particularly to a conduit for conducting molten glass from a glass melting furnace for delivery to glassware forming equipment.

The invention is especially concerned with a conduit structure embodied in what is referred to as a "forehearth" for delivery of molten glass to a spout, where it is formed into gobs which are subsequently formed into the desired glassware articles, from what may be referred to as an "alcove" such as shown in the co-pending co-assigned U.S. Pat. No. 4,750,928. Reference may be had to U.S. Pat. Nos. 3,999,972, 4,494,974, and 4,553,579 for disclosures of such forehearths. While the invention is especially concerned with forehearths, it is to be understood that the principles of the present invention are also applicable to alcoves, and the term "conduit" as used herein is used in a broad sense encompassing conduits useful in alcoves as well as in forehearths.

Forehearths presently used in glass making lines are essentially elongate troughs of refractory material assembled in place from a number of individual blocks. A roof is provided for the trough, and this roof is assembled in place over the trough, also from a number of individual blocks. In the harsh, high temperature service conditions on the glass making line, the refractory material, particularly that forming the trough, erodes and must be replaced. This requires that the roof be completely disassembled and removed to gain access to the trough. The entire trough is then disassembled and the damaged blocks replaced. Finally the trough and roof are reassembled. This is difficult and time consuming work. The task is made more difficult because it must be carried out in the midst of the glass making line, and access is hampered by the supporting superstructure of the conduit as well as the surrounding equipment. Furthermore, since the work is being done on the line, it puts at least a portion of the glass making equipment out of service for a considerable time.

SUMMARY OF THE INVENTION

Among the objects of the present invention may be noted the provision of a conduit for molten glass, more particularly a forehearth, which is adapted for expedited servicing to reduce down time; the provision of such a conduit which, while comprising a trough and a roof for the trough, enables ready repair and/or replacement of the trough without disassembly of the roof; the provision of such a conduit adapted for removal of the trough from the line for repair and/or replacement while maintaining the roof assembled in its position on the line; and the provision of such a conduit which is economical to install as well as being economical as regards trough repair and/or replacement.

In general, according to the invention, the repair and/or replacement of the trough in the line is effected by mounting the trough on a carriage which is slidable in and out of the superstructure for supporting the conduit. The removal and replacement of the trough without disassembly of the roof is accomplished by providing means associated with the superstructure for clamping the roof to the superstructure for supporting it as assembled independently of the trough.

Other objects and features will be in part apparent and in part pointed out hereinafter.

BRIEF DESCRIPTION OF THE DRAWINGS

Corresponding reference numerals indicate corresponding parts throughout the several figures of the drawings.

DETAILED DESCRIPTION OF THE PREFERRED EMBODIMENT

A conduit for molten glass constructed according to the principles of this invention is indicated in its entirety at 20. Generally, the conduit comprises a superstructure 22, an elongate carriage 24, and a plurality of refractory blocks 26 on the carriage assembled to form a longitudinally extending trough 28 adapted for conducting molten glass. The carriage 24 is slidably mounted in the superstructure 22, having an operative position in which the trough 28 is in position to conduct molten glass, and can be slid out of the operative position and out of the superstructure 22 to facilitate access to the blocks 26.

Figure 1:
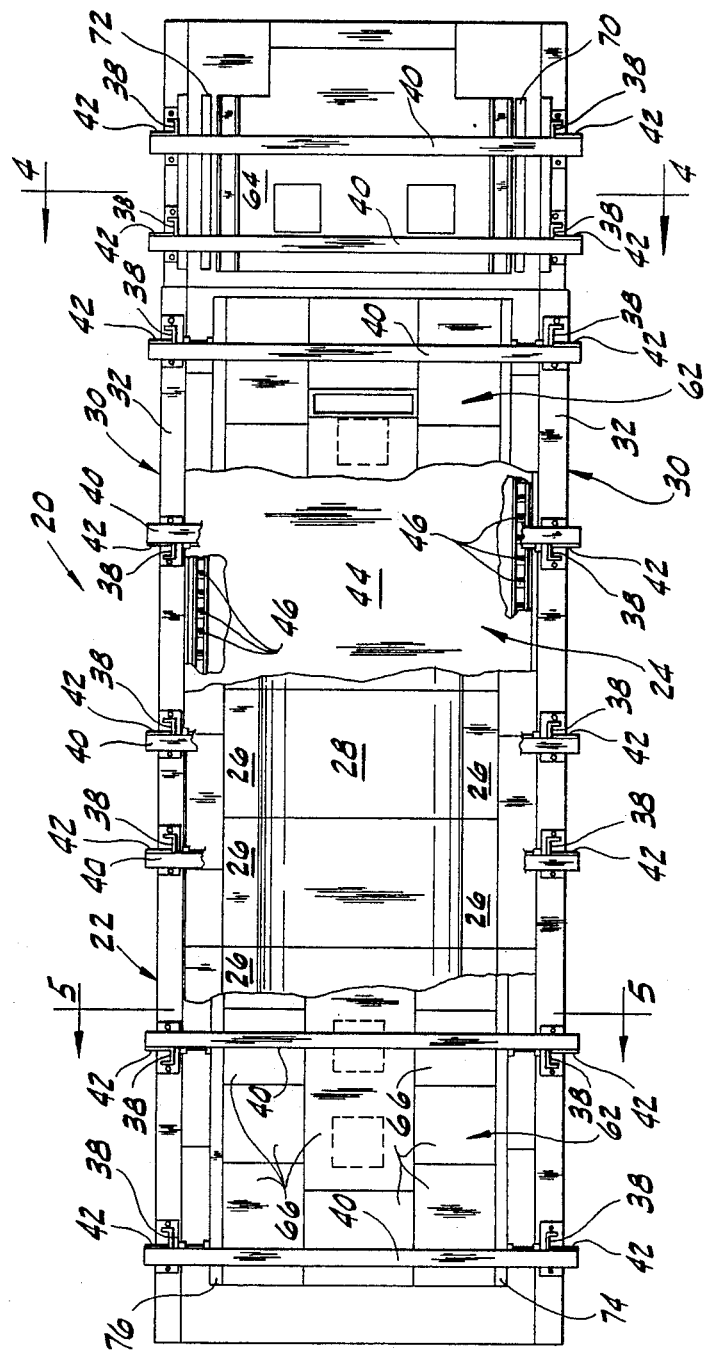
FIG. 1 is a top plan view of a conduit constructed according to the principles of this invention, with portions broken away to show the trough for conducting molten glass and the supporting carriage.
Figure 2:
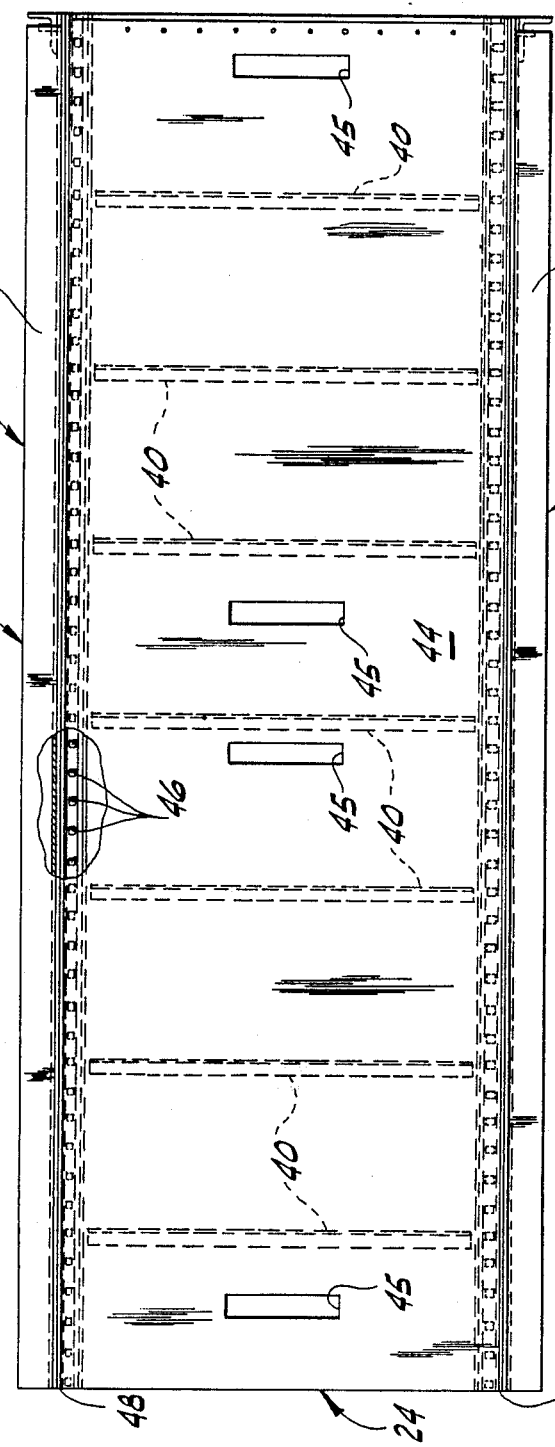
FIG. 2 is a top plan view of the carriage and supporting superstructure with portions of the superstructure removed for clarity.
Figure 3:
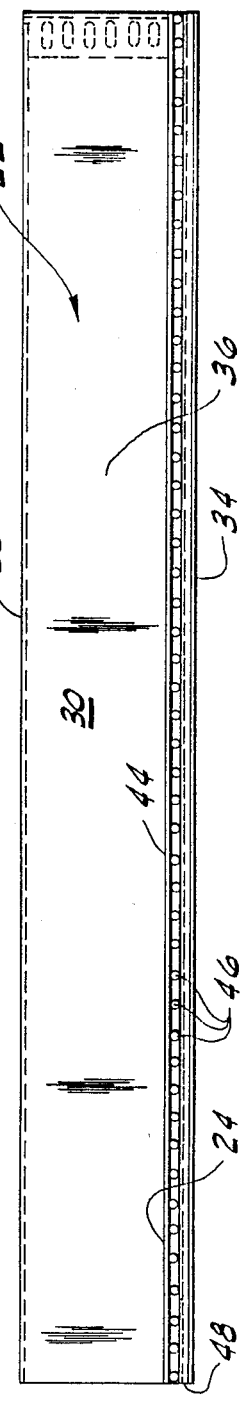
FIG. 3 is a side elevation of the carriage and supporting superstructure with portions of the superstructure removed for clarity.
Figure 5:
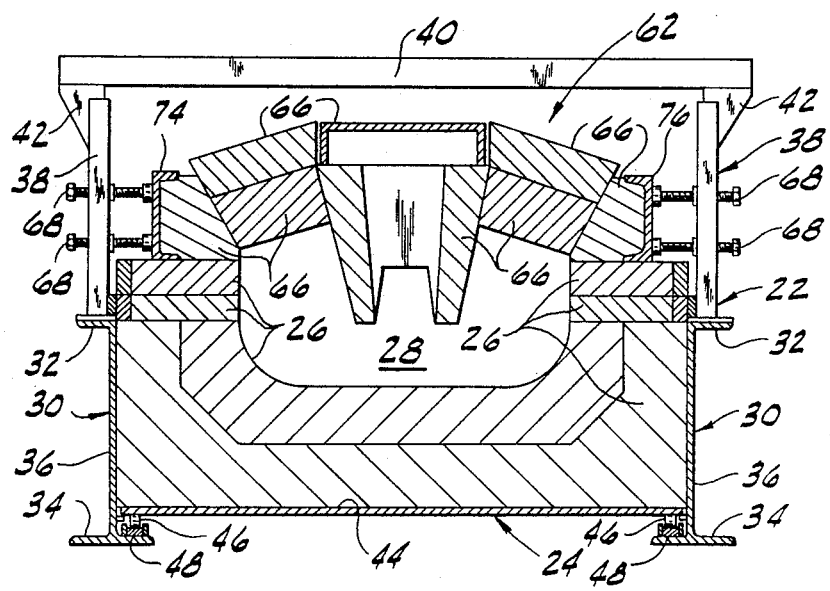
FIG. 5 is a cross-sectional view of the conduit taken along the plane of line 5—5 in FIG. 1.
Figure 6:
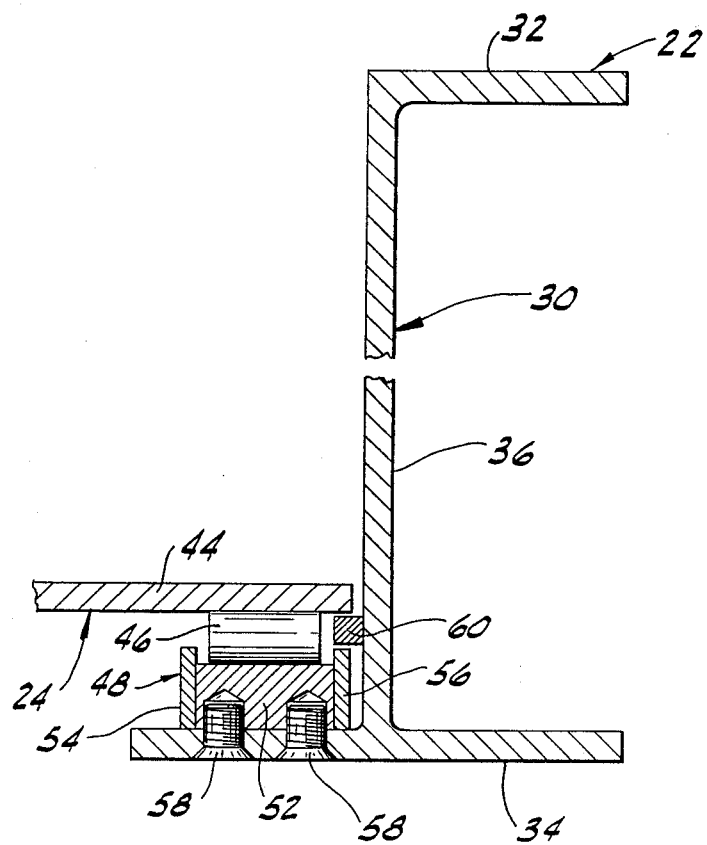
FIG. 6 is an enlarged partial sectional view of the superstructure and carriage, showing the rollers slidably supporting the carriage in the superstructure with portions of the superstructure removed for clarity.

The superstructure 22 comprises two generally parallel elongate I-beams 30 positioned on opposite sides of the conduit. The I-beams 30 each comprise horizontal top and bottom flanges 32 and 34, respectively, and a vertical connecting web 36. As best shown in FIGS. 5 and 6, the inwardly projecting portions of the horizontal top flanges 32 have been removed. The superstructure 22 further comprises a plurality of vertical standards 38, positioned oppositely from each other on I-beams 30. (These have been removed in FIGS. 2, 3 and 6 for clarity.) The vertical standards 38 comprise sections of C-shaped channel arranged with their open sides facing outwardly and attached at their bottom ends to the top flanges 32 of the I-beams. Cross-members 40 extend across the conduit between the top ends of opposing vertical standards 38, and are attached thereto by brackets 42. Cross-members 40 comprise sections of L-shaped bar stock.

The carriage 24 comprises a plate 44 of steel sufficiently thick to support the weight of the refractory blocks 26 assembled thereon. The plate 44 may be provided with a plurality of cooling vents 45. The plurality of refractory blocks 26 are arranged on plate 44 of carriage 24 to form a longitudinally extending trough 28 for conducting molten glass, as is known in the art.

The superstructure 22 is positioned so that it supports the carriage 24 with its load of refractory blocks 26 in an operative position in which trough 28 conducts molten glass from an alcove to a spout (not shown). Means are provided for slidably mounting the carriage 24 in the superstructure 22, allowing the carriage to be slid out of the operative position and out of the superstructure 22. This mounting means preferably includes antifriction means between the carriage and the superstructure. In the preferred embodiment this mounting means comprises a plurality of generally cylindrical rollers 46. These rollers are loose, and more rugged and less expensive than fixedly mounted rollers. They also accommodate localized thermal expansion of the various components. As best shown in FIG. 6, rollers 46 are received in tracks 48 mounted on the inwardly extending portions of bottom flanges 34 of the I-beams 28 and 30. Each track 48 comprises a bottom race 52 and left and right side members 54 and 56, respectively, attached on either side of race 52 to retain rollers 46. The tracks 48 may be attached to their supporting flange with screw fasteners 58. A bumper 60 may be mounted on the inner side of the vertical web 36 of each of the I-beams 30. As the carriage 24 is slid out of the superstructure 22, the rollers drop off the end of the tracks and suitable provision is made to collect them. To slide the carriage 24 into the superstructure 22, the tracks 48 are first filled with rollers 46. Additional rollers 46 may be inserted between the plate 44 and the tracks 48 as needed.

Figure 4:
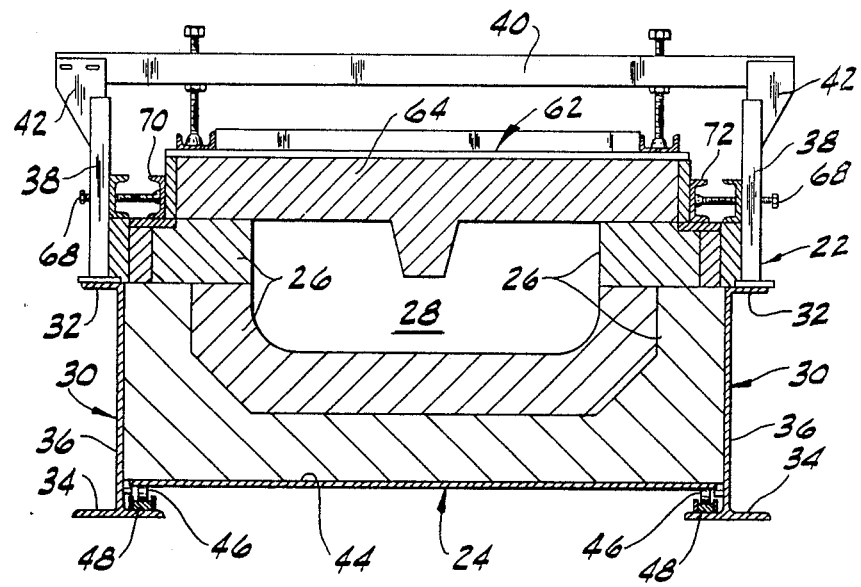
FIG. 4 is a cross-sectional view of the conduit taken along the plane of line 4—4 in FIG. 1.

The trough 28 may be provided with a roof 62, typically constructed from a plurality of refractory blocks. As best shown in FIG. 4, adjacent one end of the conduit, the roof may be constructed to form a conditioning zone as is known in the art. In this conditioning zone the roof 62 is generally flat, comprising a plurality of generally flat, single blocks 64 aligned to cover the trough 28. As best shown in FIG. 5, in the balance of the conduit the roof may be constructed to form a cooling zone, as is also known in the art. In this cooling zone the roof 62 may have an arched configuration in transverse cross section, comprising a plurality of blocks 66. Such an arched roof construction is described in co-pending, co-assigned U.S. patent application Ser. No. 07/066,774 incorporated herein by reference.

If a roof 62 is provided then the conduit 20 preferably further comprises means for clamping the roof 62 to the superstructure 22 to maintain the roof 22 suspended in position for sliding the carriage 24 out from under the roof 62 and out of the superstructure 22. In the preferred embodiment this clamping means comprises support members 68 on superstructure 22 which can be operated transversely inwardly to engage and support the sides of the roof 62. These support members 68 are preferably threaded members that are threadedly mounted in the vertical standards 38, and can be operated transversely inwardly or outwardly by turning them. Support members 68 may engage the sides of the roof 62 directly, or clamping members may be provided for the support members to engage. As shown in FIG. 4, clamping members 70 and 72 are provided on the sides of the blocks 64 comprising roof 62. Clamping members 70 and 72 are sections of C-shaped channel arranged with the bottom of the channel engaging the sides of the blocks 64. Small rings of tubing (not shown) may be welded in the bottom of the channel to form seats for the ends of the support members 68. The support members 68 are preferably not attached to the channel, to allow localized thermal expansion. The support members 68 can be tightened to engage clamping members 70 and 72 which in turn support and engage the roof so that the carriage 24 can be slid from the superstructure. As shown in FIG. 5, clamping members 74 and 76 are provided to engage the blocks 66 forming the sides of the roof 62. Clamping members 74 and 76 are sections of C-shaped channel arranged so that the channel faces the roof to thereby engage the sides and at least a portion of the bottom of the blocks 66 forming the sides of the roof. As described above, rings of tubing may be welded on the channel to form seats for the support members. The support members 68 can be tightened to engage clamping members 74 and 76 which in turn engage and support the roof 62 so that the carriage 24 can be slid from the superstructure.

OPERATION

A plurality of refractory blocks 26 are assembled on plate 44 of carriage 24 to form a longitudinally extending trough 28. Carriage 24 is then slid on rollers 46 into superstructure 22, into an operative position where trough 28 can conduct molten glass in the glass making line. A roof 62, constructed from a second plurality of refractory blocks 64 and 66 can be assembled over the trough 28.

The refractory material forming the trough is eventually worn and damaged by the intense heat and the harsh service conditions, and must be replaced. This typically occurs well before the blocks 64 and 66 forming the roof 62 need repair. The support members 68 and threaded inwardly until the clamping members 70 and 72 engage and support the sides of the blocks 64 and until the clamping members 74 and 76 engage and support the sides of the blocks 66. With the roof thus clamped to the support structure 22, carriage 24 can be slid on the rollers 46 out of its operative position and out of superstructure 22 to facilitate access to the blocks 26. The trough can easily be rebuilt unimpeded by the superstructure 22 or the roof 62. If desired, the carriage 24 can be removed to another location for more convenient servicing. In the meantime, a replacement carriage and trough can be slid into the superstructure 22 so that glass making operations can continue. Once the repaired trough or the replacement trough is slid into the operative position, support members 68 are operated to release the roof 62, and glass making can be resumed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conduit for conducting molten glass in a glass making operation comprising:
   an elongate superstructure having first and second opposing elongate sides;
   an elongate carriage;
   a plurality of refractory blocks assembled on the carriage to form a longitudinally extending channel on the carriage for conducting molten glass;
   a plurality of rollers for supporting the carriage on the superstructure in an operative position in which the channel is in position to conduct molten glass and allowing the carriage to be slid out of the operative position and out of the superstructure;
   a roof for the longitudinal channel on the carriage; and means for clamping the roof to the superstructure to maintain the roof suspended in position for sliding the carriage out from under the roof and out from the superstructure.

2. The conduit according to claim 1 wherein the means for clamping the roof comprises a plurality of support members on the sides of the superstructure which can be operated transversely inwardly to engage and support the sides of the roof.

3. The conduit according to claim 2 wherein the support members have threads and are threadedly mounted in the sides of the superstructure.

4. The conduit according to claim 2 wherein the roof is formed from a second plurality of refractory blocks.

5. The conduit according to claim 4 further comprising elongate clamping members extending on each side of the roof, the clamping members adapted to engage at least the sides of the blocks that form the sides of the roof.

6. The conduit according to claim 1 wherein the roof comprises a second plurality of blocks assembled to form a roof having an arched transverse cross section and wherein the means for clamping the roof comprises clamping members extending longitudinally on each side of the roof and engaging the sides and at least a portion of the bottoms of the blocks that form the sides of the roof, and support members on the sides of the the superstructure which can be operated transversely inwardly to engage and support the clamping members.

7. A conduit for conducting molten glass in a glass making operation comprising:
 an elongate superstructure having first and second opposing elongate sides;
 an elongate carriage;
 a first plurality of refractory blocks on the carriage assembled to form a longitudinally extending channel on the carriage for conducting molten glass;
 a plurality of rollers on the superstructure for supporting the carriage in an operative position in which the channel is in position to conduct molten glass, and allowing the carriage to be slid out of operative position and out of the superstructure;
 a second plurality of refractory blocks assembled to form a roof having an arched transverse cross section;
 clamping members extending on longitudinally on each side of the roof, the clamping members engaging the external sides and at least a portion of the bottoms of the blocks forming the sides of the roof;
 means on the superstructure for extending transversely inwardly to engage and support the clamping members to support the roof.

8. The conduit according to claim 7 wherein the means for extending transversely inwardly comprises a plurality of threaded members threadly mounted in the sides of the superstructure which can be threaded inwardly to engage and support the clamping members.

9. In a conduit for conducting molten glass of the type comprising a first plurality of refractory blocks assembled to form a channel for conducting molten glass and a second plurality of refractory blocks assembled to form a roof for the channel in the first plurality of blocks, the improvement comprising a superstructure for supporting the conduit, the superstructure including:
 a carriage for supporting the first plurality of blocks;
 a plurality of rollers for supporting the carriage on the superstructure in an operative position in which the channel is in position to conduct molten glass, and allowing the carriage to be slid out of the operative position and out of the superstructure; and
 means for clamping the roof to the superstructure to maintain the roof suspended in position for sliding the carriage out from under the roof and out from the superstructure.

10. The improved conduit according to claim 9 wherein the means for clamping the roof comprises support members on the superstructure adapted to extend transversely inwardly to engage the sides of the roof.

11. The improved conduit according to claim 10 wherein the support members have threads and are threadedly mounted in the superstructure.

12. The improved conduit according to claim 9 wherein the roof has an arched transverse cross section and wherein the means for clamping the roof comprises clamping members extending longitudinally on each side of the roof and engaging the sides and at least a portion of the bottoms of the blocks that form the sides of the roof, and support members on the sides of the the superstructure which can be operated transversely inwardly to engage and support the clamping members.

13. The improved conduit according to claim 9 further comprising at least one track on the superstructure for receiving the rollers.

* * * * *